United States Patent [19]

Defretin

[11] Patent Number: 4,709,388
[45] Date of Patent: Nov. 24, 1987

[54] SUBSCRIBER TELEPHONE LINE INTERFACE CIRCUIT WITH REDUCED POWER STAND-BY MODE

[75] Inventor: Bruno Defretin, St. Egreve, France
[73] Assignee: Thomson-CSF, Paris, France
[21] Appl. No.: 828,691
[22] Filed: Feb. 12, 1986

[30] Foreign Application Priority Data

Feb. 15, 1985 [FR] France .................. 85 02249

[51] Int. Cl.$^4$ .......................................... H04M 19/00
[52] U.S. Cl. ..................................... 379/413; 379/345
[58] Field of Search ........... 179/18 FA, 16 AA, 16 F, 179/18 FA, 70, 77, 170 NC, 170 R; 379/338, 343, 340, 344, 345, 348, 347, 399, 405, 413; 340/425

[56] References Cited

U.S. PATENT DOCUMENTS 4,130,735 12/1978 Chambers, Jr. et al. ......... 179/16 F
4,387,273 6/1983 Chea, Jr. ........................... 179/16 F
4,567,331 1/1986 Martin ........................... 179/170 NC

OTHER PUBLICATIONS

IEEE Journal of Solid-State Circuits, vol. SC-16, No. 4, Aug., 1981, pp. 261-266, IEEE, New York, US; D. W. Aull et al.: "A High-Voltage IC for a Transformerless Trunk and Subscriber Line Interface", p. 261, colonne de droite, ligne 21-p. 264, colonne de droite, ligne 8.
IEEE Journal of Solid-State Cirucits, vol. SC-18, No. 3, Jun. 1983, pp. 316-324, IEEE, New York, US; J. M. Dannells et al.: "Monolithic 70 V Bipolar Line-Driver IC for PCM SLIC", p. 318, colonne de droite, ligne 3-p. 322, colonne de dreoite, ligne 13.
IBM Technical Disclosure Bulletin, vol. 26, No. 4, Sep. 1983, pp. 2033-2035, New York, US; Y. Bonnet et al.: "Feeding Circuit with Reduced Power Consumption", en entier.

Primary Examiner—Gene Z. Rubinson
Assistant Examiner—R. Vaas
Attorney, Agent, or Firm—Oblon, Fisher, Spivak, McClelland & Maier

[57] ABSTRACT

A subscriber telephone line interface circuit is provided with reduced power stand-by mode. For 90% of the time such circuits only have a function of monitoring the line. Means are described for considerably reducing the power consumption of the circuit during such monitoring periods. The reduction is provided essentially by modifying the construction of the output stages connected to the telephone line; these stages become generators of a fixed voltage for biasing the line when the circuit is in monitoring mode.

2 Claims, 6 Drawing Figures

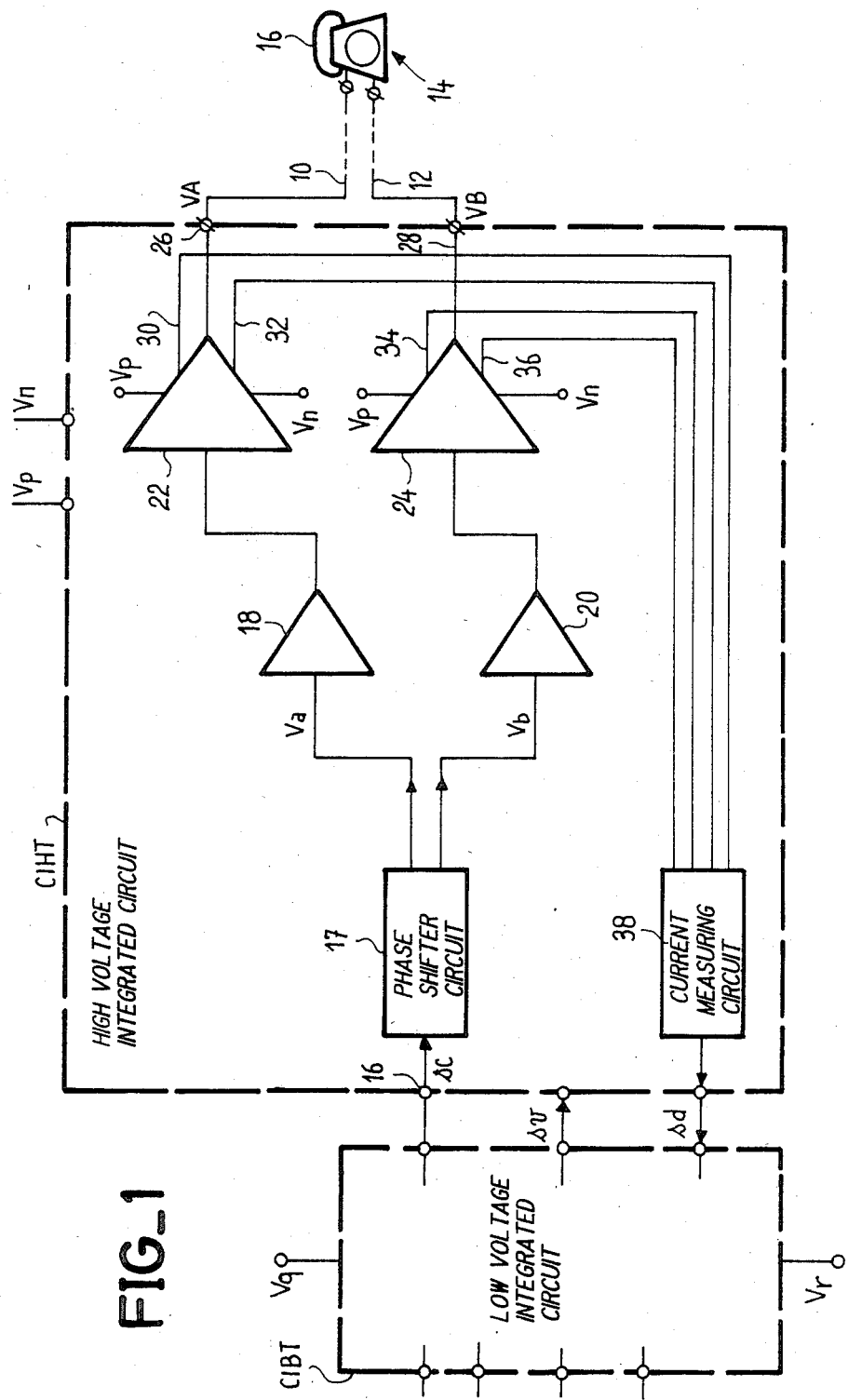
FIG_1

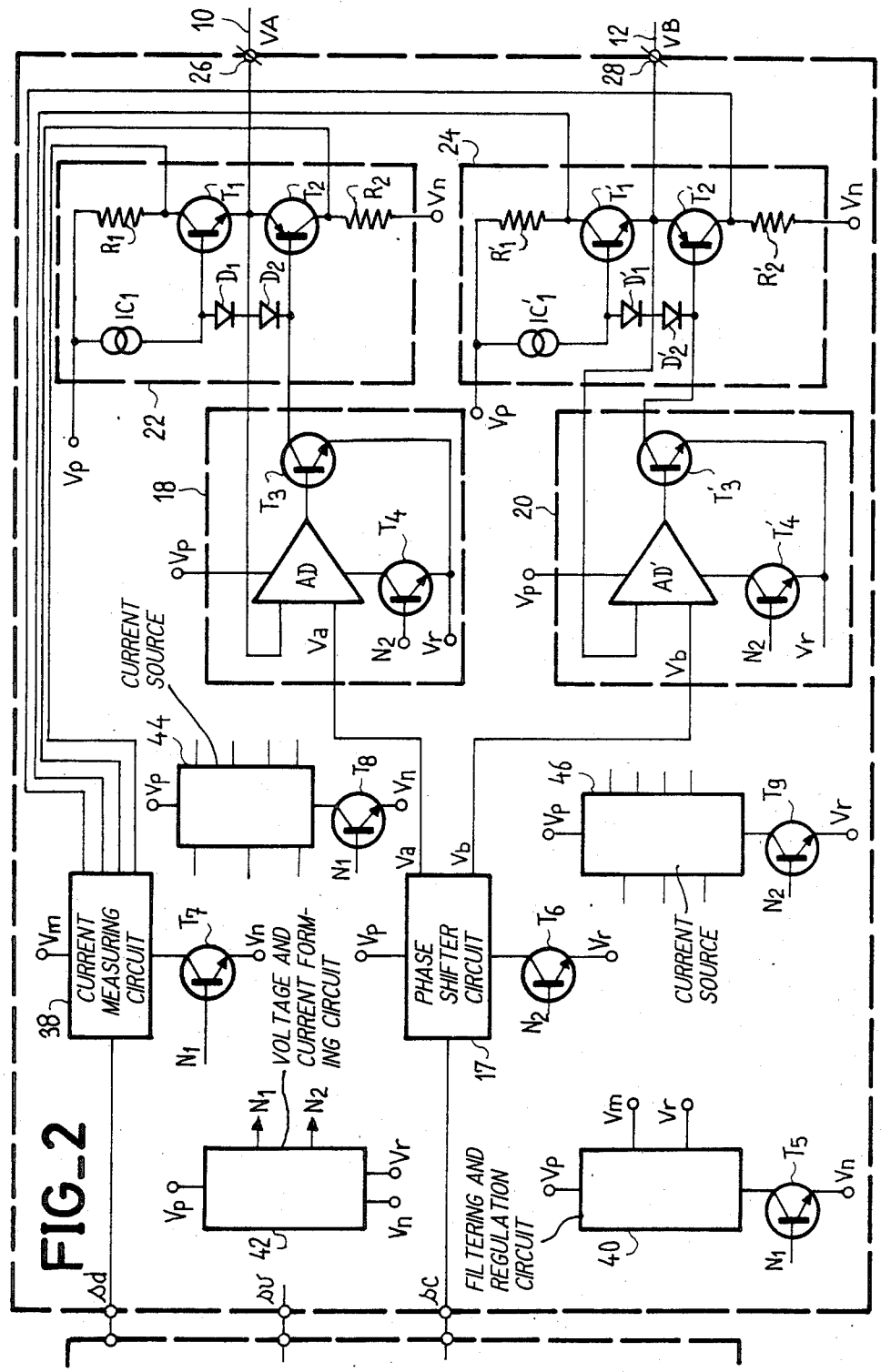

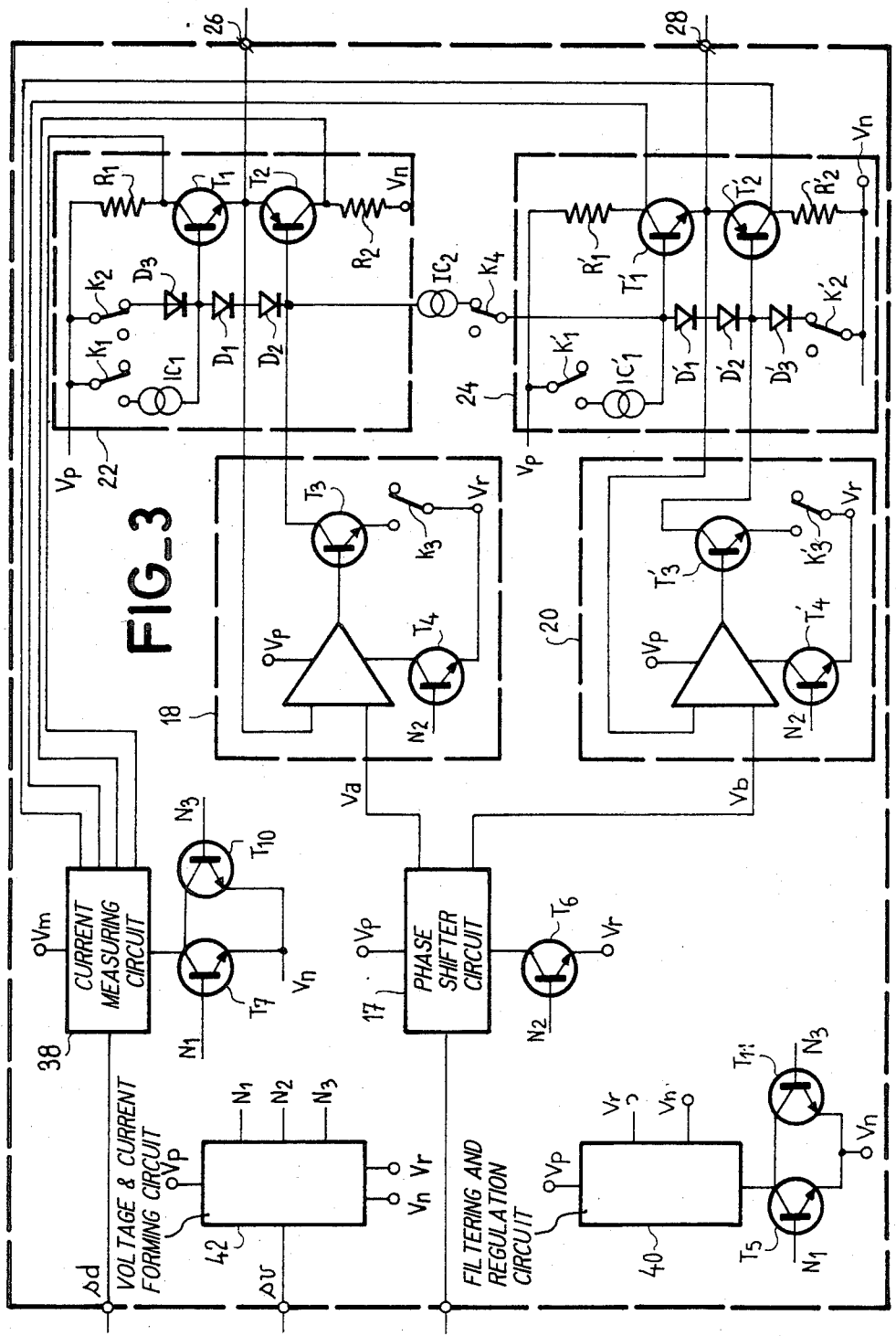

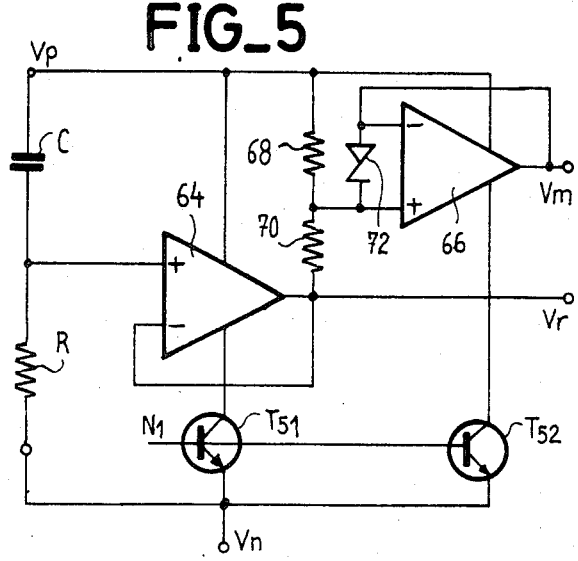
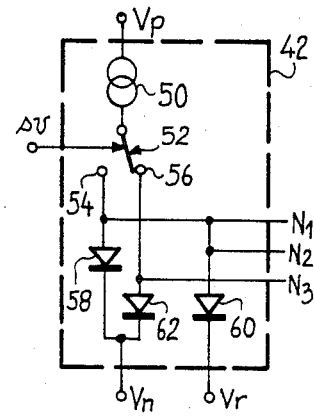
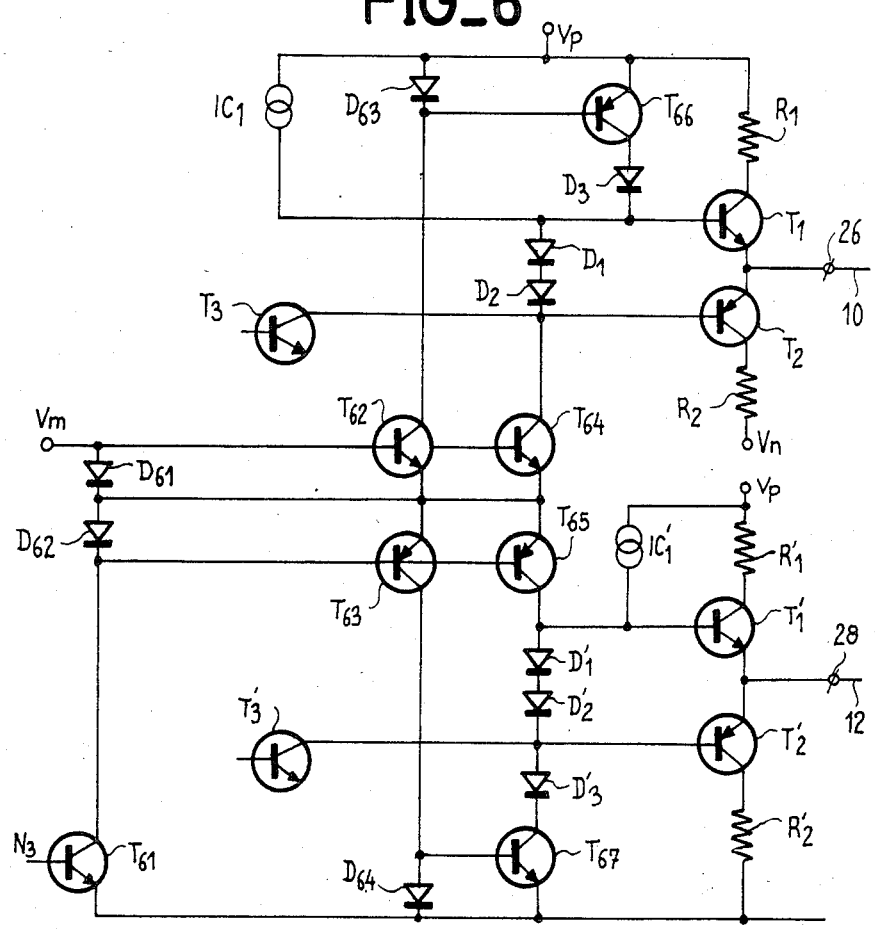

SUBSCRIBER TELEPHONE LINE INTERFACE CIRCUIT WITH REDUCED POWER STAND-BY MODE

BACKGROUND OF THE INVENTION

1. Field of the Invention

The invention relates to a subscriber telephone line interface circuit, that is to say a circuit forming part of a telephone exchange and intended to be connected to an individual subscriber telephone line for transmitting signals over this line and receiving signals from this line.

2. Description of the Prior Art

The average rate of occupation of a telephone line is about 10%, which means that for about 90% of the time the interface circuit has nothing to do but observe the current on the line for detecting lifting of the handset. Such observation does not require a very high power consumption but, in fact, the other unused functions of the circuit remain active and wastefully consume power. It is essential to reduce this power as much as possible so as to reduce the space required by the telephone exchanges which comprise thousands of such circuits. The space required in fact depends mainly on the heat dissipation requirements of the power consumed in these numerous circuits.

In presently known telephone exchanges, the interface circuit connected to a telephone line is in fact formed of two integrated circuits, one providing an interface function properly speaking and being fed with a voltage of about 50 volts and the other providing a certain "intelligence", namely signal processing; the second circuit is fed with about 10 volts.

The high tension integrated circuit in particular imposes the voltage on the line and it measures the AC and DC current present on the line. The result of the measurement is transmitted to the low tension integrated circuit which processes this information and sends a feed-back signal to the high tension circuit. The low tension circuit further serves for transmitting signals over the line and more particularly conversation signals.

There exists then a permanent feed-back loop between the two circuits. This loop exists also when the handset is replaced.

To reduce the power consumed during the line observation phases (90% of the time), it has already been proposed to simply reduce the currents supplying the different parts of the circuits, since the operating requirements are not the same as outside line observation phases; in fact, during the observation phase there is no AC current to be transmitted.

Thus the overall power consumed may be reduced but only in a small proportion.

SUMMARY OF THE INVENTION

The present invention proposes maintaining monitoring of the line while completely ceasing to supply 70% of the functions of the high tension circuit, while keeping an absorbtion capacity of the longitudinal current on the line, which is an important factor (it will be recalled that the longitudinal current is that which is induced and not transmitted over the subscriber line). Monitoring of the line consists in detecting lifting of the handset at the other end of the line, and for that in measuring the current present thereon (a DC current component greater than a given threshold indicates lifting of the handset). The line current is measured in the high tension integrated circuit and the corresponding information is processed by the low tension integrated circuit and by a microprocessor which may be associated with these two circuits in the telephone exchange.

So as to provide a very considerable reduction of the power consumption of the interface circuit in the line monitoring mode, in accordance with the invention this circuit comprises:

a first and second amplifier for transmitting differential signals to a first and second conductor of the subscriber line, each amplifier comprising an input stage and an output stage, each output stage comprising two push-pull connected transistors energized between a first and second supply potential common to the two output stages, the interface circuit further comprising a means for measuring the current in the line and a terminal for receiving from a processor a stand-by signal indicating that the circuit is to be placed in the stand-by-mode with low power consumption; the circuit further comprises means for:

determining the biasing of the transistors of the output stages so as to establish between the line conductors connected to the transistors at the output stages a desired fixed potential difference, disconnecting the input stages from the output stages, for suppressing the power supply for most of the other elements of the circuit but not of the push-pull transistors of the output stages nor of the line current measuring circuit nor of the circuit elements required for establishing and modifying the stand-by signal;

the whole of these operations being effected when the stand-by signal is received.

With this arrangement, the following results are obtained:

when the line is in use, the output stages effectively serve as amplifiers transmitting signals over the line and absorbing the longitudinal current which may be present.

In the monitoring mode (detected by measuring the line current and imposed by a stand-by signal delivered by a processor receiving the line current measuring information), the output stages no longer receive input signals, but they maintain a high fixed potential difference between the line conductors (for monitoring lifting of the handset). The line current measuring circuit continues to operate. The absorption of the longitudinal current is still provided through the push-pull transistors of the output stage.

Finally, in the monitoring mode, the other circuit elements are no longer supplied with power so that power dissipation is greatly reduced.

BRIEF DESCRIPTION OF THE DRAWINGS

Other features and advantages of the invention will be clear from reading the following detailed description with reference to the accompanying drawings in which:

FIG. 1 shows the general architecture of the subscriber line interface circuit,

FIG. 2 shows the high tension circuit in greater detail,

FIG. 3 shows the modified circuit of the invention,

FIG. 4 shows a detail of the reference current and voltage elaborating circuit,

FIG. 5 shows a detail of the regulation circuit, and

FIG. 6 shows a concrete example of the modifications made to the output stages of the interface circuit.

DESCRIPTION OF THE PREFERRED EMBODIMENTS

FIG. 1 shows a subscriber telephone line interface circuit architecture such as it may be designed today.

The line is represented by two conductors 10 and 12 connected to a subscriber telephone set 14 having normally a handset 16.

The interface circuit is placed in a telephone exchange serving a large number of subscribers and there is an interface circuit for each subscriber line. The different interface circuits are controlled by computers or microprocessors not shown.

In one embodiment, the interface circuit comprises essentially an integrated circuit operating with relatively high voltages which may go up to 150 V for example and an integrated circuit operating solely with low voltages (up to 10 V for example). The first integrated circuit is designated by the reference CIHT, the second by the reference CIBT.

The high tension circuit CIHT is fed with a first and second supply potential Vp and Vn respectively. For example Vp=0 volt and Vn=−48 volts.

The low tension circuit is supplied between two potentials Vq and Vr; for example Vq=+5 volt and Vr=−5 volts.

The high tension circuit is in an interface circuit properly speaking: it receives signals to be transmitted over the line and conversely it receives signals from the line. It has however other functions which will be mentioned further on.

The low tension circuit is especially a circuit for processing signals and controlling the high tension circuit.

In FIG. 1, some main elements of the high tension circuit have been shown for they are required for understanding the invention; other elements are of course provided but they have not been shown so as not to interfere with the understanding of the invention.

An input 16 of the high tension circuit receives from the low tension circuit a signal sc (a conversation or ringing signal). This signal sc is applied to a phase shifter circuit 17 which produces two voltages Va and Vb whose difference is proportional to the signal sc. These voltages are transmitted respectively to two preamplifiers 18 and 20 whose outputs are connected respectively to the input of an output stage 22 and an output stage 24. The output 26 from the output stage 22 is applied to the line conductor 10 to which it supplies a voltage VA proportional to Va, whereas the output 28 of the output stage 24 is applied to the line conductor 12 to which it supplies a voltage VB proportional to Vb.

Output stage 22 and output stage 24 are both supplied directly between the supply potentials Vp and Vn.

The purpose of these stages is conventionally:

to apply potentials VA and VB to the line conductors, as a function of signals Va and Vb so as a function of the signal sc;

to absorb the longitudinal current present on the line (current portion appearing in the same direction on both line conductors at the connection terminals 26 and 28 between these conductors and the high tension integrated circuit);

to allow the current flowing in the line conductors to be measured.

To accomplish this latter function, measurement wires (30 and 32 for stage 22, 34 and 36 for stage 24) have been shown; these wires transmit information concerning the current flowing in the output stages 22 and 24; this information is transmitted to a current measuring circuit 38 which itself outputs information (signal sd) to the low tension integrated circuit.

In so far as the invention is more particularly concerned, it may be considered that information sd is information relating to the fact that the handset has been lifted or replaced at the other end of the line. This information may in fact be obtained by measuring the DC component which may be present in the transverse line current.

The low tension circuit may transmit this information to a microprocessor controlling several lines.

The dialogue between the microprocessor and the low tension circuit normally results in this latter circuit producing a stand-by signal sc sent back to the high tension circuit. This signal sv, when it is present, indicates that the interface circuit is simply providing a line monitoring function; when it is absent, the interface circuit must provide other functions (particularly in the transmission of signals).

After this general description of the functions of the interface circuit, FIG. 2 will now be described which shows in greater detail one example of construction of the high tension integrated circuit. The purpose of this example is especially to show concretely one embodiment of the output stages; it also indicates that most of the functions of the circuit are (or may be) supplied through current sources; it will be understood that, if these current sources are neutralized, the corresponding functions are no longer supplied so that the power consumption of the circuit may be reduced by thus cutting off the supply to the functions which are not used in the monitoring mode.

In FIG. 2, elements corresponding to those of FIG. 1 bear the same references.

The output stages are formed in the following way: each stage comprises a push-pull circuit with two transistors (T1,T2 for stage 22, T'1 T'2 for stage 24).

This push-pull circuit is connected directly across the supply terminals delivering the supply potentials Vp and Vn. However, current measuring resistors R1, R2 and R'1 and R'2 may be inserted in series with the collectors of the transistors T1, T2, T'1, T'2. As a variant, resistors could be inserted in series with the line conductors themselves.

The junction point between the emitters of transistors T1 and T2 forms the output (terminal 36) of stage 22, and similarly the junction point between the emitters of transistors T'1 and T'2 forms the output (terminal 28) of stage 24.

The base of transistor T1 is connected to the junction point between a current source IC1 and an assembly of two series diodes D1, D2. This assembly of two series diodes is connected between the bases of transistors T1 and T2.

The base of transistor T2 serves as input for the output stage. It is connected to the output of the preamplifier 18.

The circuit is exactly the same for amplifier 24. "Prime" indices are added to the corresponding elements.

The preamplifiers 18 and 20 are for example supplied between the potential Vp and a stabilized potential Vr. This potential Vr is delivered by a filtering and regulation circuit 40 which may in addition also supply other potentials such as a potential Vm specially intended for the current measuring circuit 38.

By way of example, Vr may be very close to Vn (−46 to −48 volts for example); Vm may be equal to half Vr (−23 or −24 volts for example).

The preamplifier 18 comprises by way of example a differential amplifier AD and an output transistor T3.

The differential amplifier AD receives at one input the voltage VD from the phase shifter and at another input a feed-back formed by the output voltage VD of the output stage. The output of the differential amplifier AD drives the base of transistor T3 whose emitter is a potential Vr.; the connector of T3 forms the output of the preamplifier; finally, the differential amplifier AD is supplied between the potentials Vp and Vr by means of a current source. This current source is formed by a transistor T4 whose emitter potential is Vr and whose base potential is fixed at a value N2 by a reference current and voltage forming circuit 42. This circuit 42 is fed from potentials Vp, Vn and Vr and produces two reference potentials N1 and N2 serving for generating different reference currents at several points in the circuit.

Thus, a reference potential difference N2−Vr, formed in accordance with the principle of current mirrors, i.e. established from the voltage drop in a diode through which flows a reference current internal to the source 42, serves for fixing at a constant value the current in transistor T4 whose emitter is at a potential Vr, as well moreover as in all the transistors whose emitter is at potential Vr and base at potential N2.

Another potential difference N1−Vn (established in accordance with the same principle) serves for fixing the current in all the transistors whose emitter is connected to potential Vn and the base to potential N1.

The circuit of the preamplifier 20 is exactly the same and will not be described. Simply, a differential amplifier AD′ controls an output transistor T′3 and is fed from a current source formed by a transistor T′4 whose base potential is N2 and whose emitter potential is Vr.

To complete the description of FIG. 2, the filtering circuit which produces the voltage Vr and the voltage Vm may itself be fed from a current source (transistor T5) driven by the potential difference N1−Vn; the phase shifter 17 may be fed from a current source (transistor T6) driven by the voltage N2−Vr; the current measuring circuit 38 may be fed from a current source (transistor T7) driven by a voltage N1−Vn. Finally, some other functions shown as a whole by a rectangle 44 may be supplied from one or more current sources (transistor T8) driven by the voltage N1−Vn whereas other functions shown as a whole by a rectangle 46 may be supplied from one or more current sources (transistor T9) driven by the voltage N2−Vr.

The diagram of FIG. 2 having been thus described the diagram of FIG. 3 will now be described which contains some of the elements of FIG. 2 to which have been added a number of other specific elements of the invention.

It will be understood that the elements described in FIG. 2 are kept in the high tension integrated circuit even if they do not appear in FIG. 3 for reasons of simplification and representation. Thus blocks 44 and 46 have not been shown in FIG. 3. The functions corresponding to these blocks normally cease to be supplied with power under stand-by conditions.

The elements added or modified in FIG. 3 are the following:

(1) first of all the reference current and voltage forming circuit (42) produces a third voltage N3 for controlling the base of several additional transistors all having their emitter connected to the potential Vn. It will be seen further on how the third control voltage N3 is produced only during the presence of the stand-by signal sc, the voltages N1−Vn and N2−Vr being cancelled out or practically cancelled out when the signal sv is present. On the contrary, in the absence of the signal sv it is the voltage N3−Vn which is zero or practically zero whereas the voltages N1 and N2 have values allowing normal operation of the different current sources T4, T′4 and T5 to T9. Circuit 42 is therefore now controlled by signal sv.

(2) then, a transistor T10 serving as auxiliary current source to be substituted for transistor T7 has its collector connected to the measuring circuit 38 for maintaining a sufficient power supply for this circuit under stand-by conditions whereas transistor T7 is disabled. This transistor T10 has its base connected to potential N3 and its emitter connected to potential Vn; other transistors similar to transistor T10 could be connected at other points of the circuit for accomplishing the same auxiliary power supply function.

(3) a means is provided for the filtering circuit 40 to continue to supply a voltage Vm under stand-by conditions, for the measuring circuit. It will be recalled that this voltage may be 24 volts in practice. Under normal operating conditions it is a filtered voltage, but under stand-by conditions it may be admitted that it is not filtered so as to be able to avoid the consumption of power by the filtering circuit; but in this case, an auxiliary means must be provided for ensuring the production of a voltage Vm despite the absence of a power supply for the filtering circuit. A simple means will be described with reference to FIG. 5, but in FIG. 3 a transistor T11 (similar to transistor 10 has been simply shown in parallel with the transistor T5, the base of transistor T11 being controlled by the potential N3.

4. Modifications of the output stages

The most important modifications relate to the output stages.

The purpose of these modifications is, as will be recalled, to allow normal operation of the output stages under normal operating conditions (signal amplification, absorption of the longitudinal current on the line), accomplishing other functions under stand-by conditions:

maintaining a relatively high fixed potential difference between the line conductors, absorbing the line longitudinal current, allowing measurement of the line current.

These aims are achieved in the following way:

In the absence of the stand-by signal sv, the circuit of the output stages corresponds exactly to that of FIG. 2.

The presence of the stand-by signal sv means that diode D3 is substituted for the current source IC1 of stage 22;

the base of transistor T2 is connected to the base of transistor T′1 by an additional current source IC2;

the current source IC′1 is disconnected., a diode D′3 is connected between the base of transistor T′2 and the potential Vn;

the outputs of the preamplifiers 18 and 20 are disconnected from the inputs of the terminal stages 22 and 24, in practice, the transistors T3 and T′3 are disabled. FIG. 3 shows in a simplified general diagram how, in the presence of a signal sc (switches all turned towards the right) a diagram can be obtained different from the one obtained in the absence of a signal sc (switches all turned towards the left: diagram corresponding to FIG. 2).

FIG. 3 has been shown with switches connecting together or isolating different elements of the diagrams for accomplishing the above mentioned functions. But it will be readily understood that the practical embodiments may be quite different: for example, a current source may be formed by a transistor and, for interrupting the current flowing in the connector, either the collector can be disconnected or, which is simpler, the base can be biased so that the transistor is disabled.

In FIG. 3, a switch K1 allows the current source IC1 to be brought into service or disconnected; a switch K2 allows the diode D3 to be brought into service or disconnected; a switch K3 allows a current through the transistor T3 to be interrupted., a switch K4 allows the additional current source IC2 to be brought into service or disconnected; switches K'1, K'2, K'3 carry out the same function with respect to the elements IC'1, D'3, T'3. The switches are all controlled directly or indirectly by the potential N3.

The purpose of the whole of these additions in the output stages 22 and 24 is:

to maintain the operation of these stages in the absence of the signal sv, to transform the output stages into a generator of a fixed differential voltage on the line conductors, this voltage being close to the difference Vp−Vn, without disturbing the line current measuring and longitudinal current absorbing facilities.

It may be seen that, when the switches are all turned towards the right (presence of signal sv), the voltage at the terminal 26 is practically equal to Vp reduced by the two forward diode voltage drops (D3, D1) i.e. about Vp−1.2 volts. Similarly, the voltage at 10 and 28 is practically Vn+1.2 volts.

The DC current source IC2 serves for causing a known current to flow through the six diodes D1 to D3 and D'1 to D'3.

The following Figures show the details of construction of the circuit of FIG. 3.

First of all, FIG. 4 shows how the reference voltage and current forming circuit 42 may be constructed.

A current source 50 is connected to a switch 52 which directs the current from the source either towards a circuit node 54 or to a circuit node 56. At node 54, the current is divided into two portions flowing respectively through a diode 58 and through a diode 60. Diode 58 is connected between node 54 and the potential Vn. The diode 60 is connected between the node 54 and potential Vr coming from the filtering circuit. The potentials N1 and N2 are taken from the same node 54 (here N1=N2). Switch 52 connects the current source 50 to the node 54 in the absence of the stand-by signal sv.

At node 56, the current from source 50 is applied to a diode 62 further connected to the potential Vn. The potential N3 is taken off at node 56. Switch 52 connects the current source 50 in the presence of the stand-by signal sv.

FIG. 5 shows how the regulation circuit 40 may be constructed producing the voltages Vr and Vm with a means so that a voltage Vm approximately intermediate between Vp and Vn is produced even when the regulation circuit is no longer supplied with a current by the transistor T5 (without for all that providing a transistor T11 as in FIG. 3).

The filtering circuit comprises two differential amplifiers 64 and 66 supplied between the voltage Vp and the voltage Vn, one through a current source formed by a transistor T51 controlled by the potential N1, the other through a transistor T52 also controlled by the potential N1.

The amplifier 64 (with unitary gain) produces a voltage Vr practically equal to Vn but filtered because at its input it is connected to a RC divider bridge.

Amplifier 66, also looped for unitary gain has its input connected to the middle point of divider bridge (resistor 68 and 70) connected between the potentials Vr and Vp. The output of the amplifier delivers a voltage Vm corresponding to the division ratio of the divider bridge.

A zener diode 72 is placed between the differential inputs of the amplifier 66, i.e. between the input connected to the divider bridge and the input looped to the output so as to establish the unitary gain. Thus, when the transistors T51 and T52 are disabled because of the zero cross-over of the voltage N1−Vn, the amplifiers cease to be supplied with power; Vm becomes practically equal to Vp reduced by the threshold voltage of the zener diode 72. There therefore remains a voltage V'm for supplying the current measuring circuit 38. V'm may be chosen equal to the normal value of Vm.

FIG. 6 shows in detail a possible construction of the output stages.

The switching elements required for changing the configuration and operation of the circuit between the normal operating mode and the stand-by mode are formed essentially by transistors controlled indirectly from a potential N3.

Potential N3, when it is established by the signal sv, allows a current to pass through an assembly of two diodes D61 and D62 supplied between the potentials Vm and Vn. The passage of this current is allowed by a transistor T61 which serves as constant current source when the signal sv is present (zero current source when sv is absent).

A current in diodes D61 and D62 is recopied by two groups of transistors. The transistors T62 and T63 of the first group recopy this current and apply it to two diodes D63 and D64 one connected to the potential Vp and the other to the potential Vn.

The transistors T64 and T65 of the second group also recopy the current, with the same amplitude, in diodes D61 and D62 and apply the recopied current to the diodes D1, D2, D3, D'1, D'2, D'3 in series (see FIG. 3). Transistors T66 and T67 in series with these diodes form the switches K2 and K'2 of FIG. 3. They are necessarily saturated in the presence of potential N3, because of the dual current recopying; on the other hand, they are disabled if N3 drops to potential Vr in the absence of the stand-by signal sv.

Finally, no element has been specifically provided fulfilling the function of switches K1 and K'1 for bringing diodes D3 and D'3 into service is sufficient to bias the transistors T'1 and T'2 as desired while neutralizing the influences of the sources IC1 and IC'1.

What is claimed is:

1. A subscriber telephone line interface circuit comprising first and second amplifiers of signals to be transmitted respectively to first and second subscriber line conductors, each amplifier having an input stage and an output stage, each output stage comprising first and second push-pull connected transistors connected to respective line conductors and supplied between first and second supply potentials common to the two output stages, said interface circuit further comprising a means for measuring the current in the line and a terminal for receiving a stand-by signal indicating that the circuit is to be placed in stand-by mode with a low power consumption, further comprising, responsive to reception of the stand-by signal:
- means for biasing the transistors of the output stages so as to establish a fixed potential difference between the line conductors connected to the transistors of the output stages;
- means for disconnecting the input stages from the output stages; and
- means for discontinuing the power supply for most of the elements of the circuit but not for the push-pull transistors of the output stages or the line current measuring circuit.

2. The subscriber telephone line interface circuit as claimed in claim 1, wherein said biasing means of the output stages comprise, connected in series between the power supply potentials, a first diode connected between the first supply potential and a base of the first transistor of the output stage of the first amplifier, second and third diodes in series connected between bases of the first and second transistors of the output stage of the first amplifier, a constant current source connected between the base of the second transistor of the output stage of the first amplifier and a base of the first transistor of the output stage of the second amplifier, fourth and fifth diodes in series connected between bases of the transistors of the output stage of the second amplifier, and finally a sixth diode connected between the base of the second transistor of the output stage of the second amplifier and the second supply potential, the current source being neutralized in the absence of the stand-by signal and the first and sixth diodes being disconnected by switching means in the absence of the stand-by signal.

* * * * *